No. 824,854. PATENTED JULY 3, 1906.
J. W. FORD.
SCALE.
APPLICATION FILED MAY 27, 1905.

4 SHEETS—SHEET 1.

WITNESSES

INVENTOR
J. W. Ford,
BY
ATTORNEYS

No. 824,854. PATENTED JULY 3, 1906.
J. W. FORD.
SCALE.
APPLICATION FILED MAY 27, 1905.
4 SHEETS—SHEET 2.
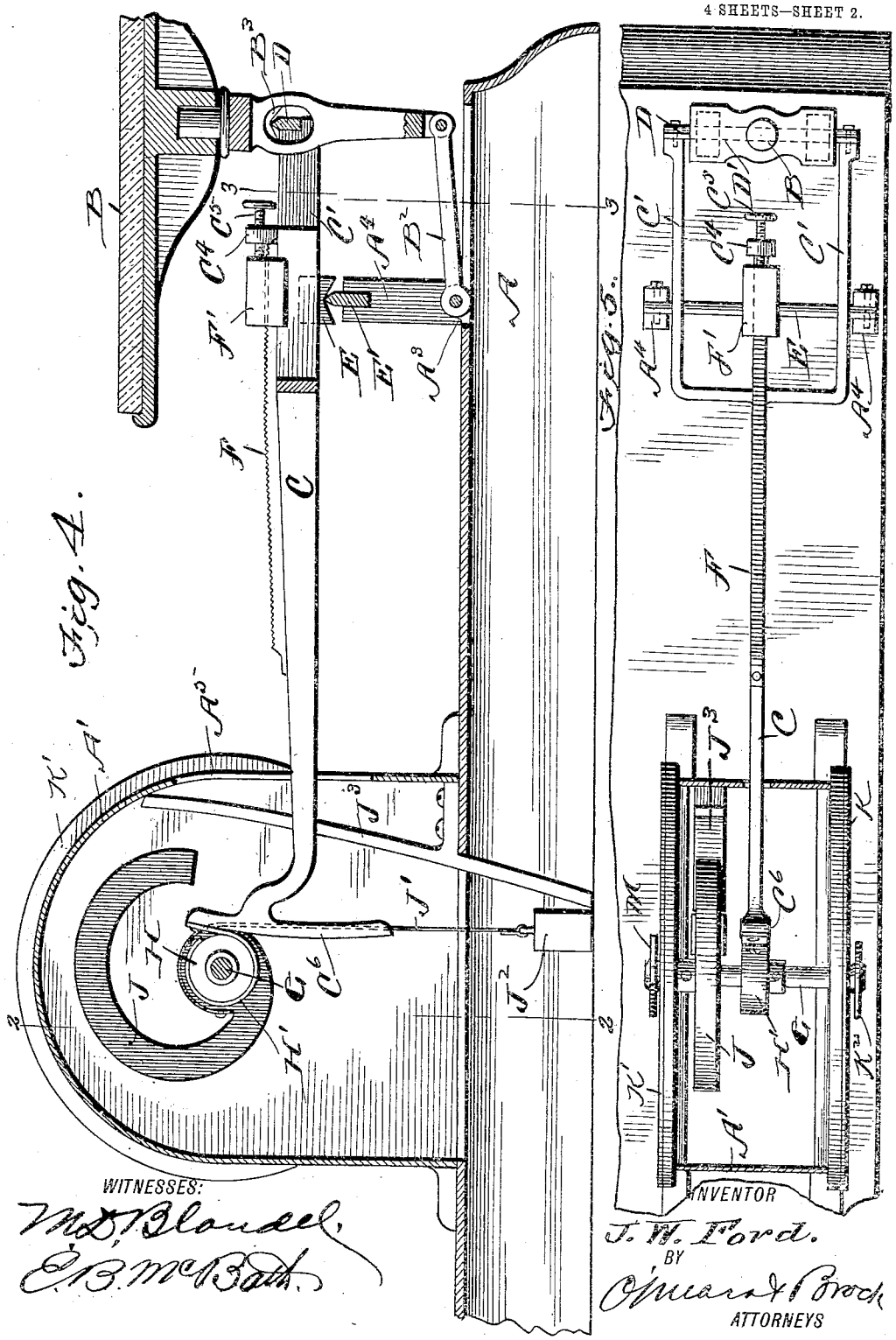
WITNESSES:
M. Blondel,
E. B. McBath.
INVENTOR
J. W. Ford.
BY
Omara & Brock
ATTORNEYS No. 824,854. PATENTED JULY 3, 1906.
J. W. FORD.
SCALE.
APPLICATION FILED MAY 27, 1905.
4 SHEETS—SHEET 3.
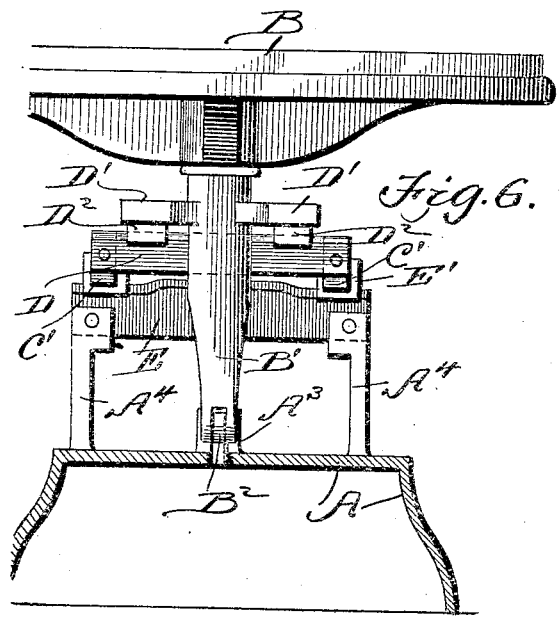
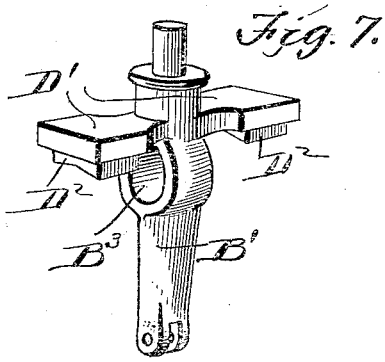
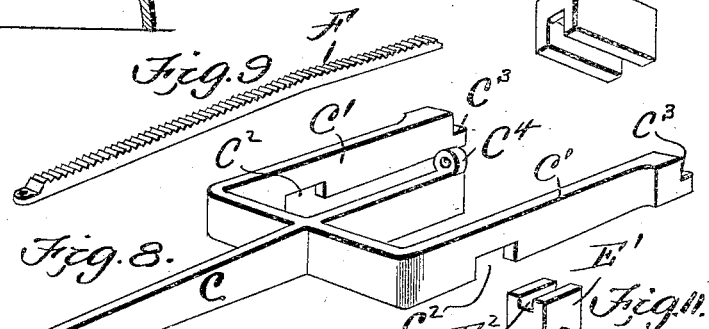
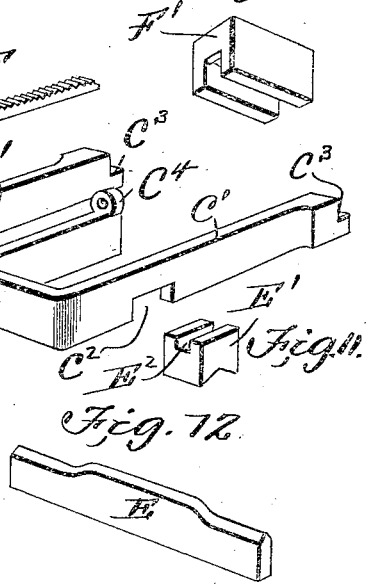
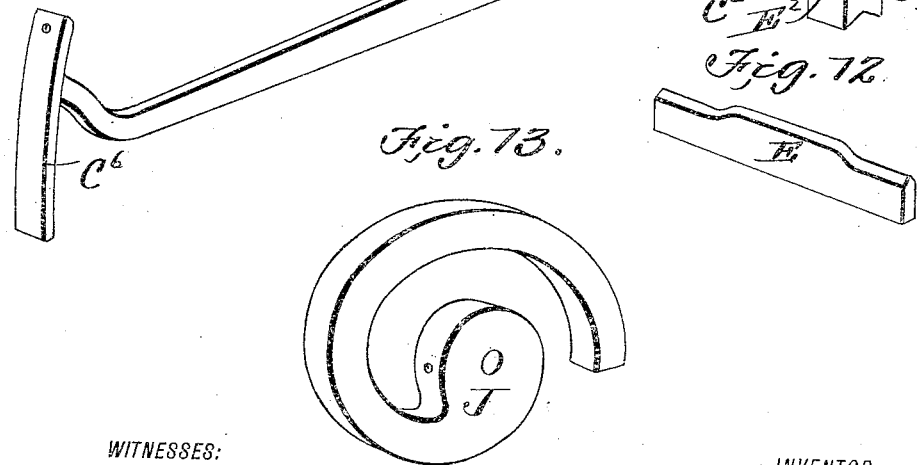
WITNESSES:
M. D. Blondel,
E. B. McBath
INVENTOR
J. W. Ford.
BY
O'Meara & Brock
ATTORNEYS
THE NORRIS PETERS CO., WASHINGTON, D. C.

No. 824,854. PATENTED JULY 3, 1906.
J. W. FORD.
SCALE.
APPLICATION FILED MAY 27, 1905.

4 SHEETS—SHEET 4.

WITNESSES:

INVENTOR
J. W. Ford.
BY
ATTORNEYS

UNITED STATES PATENT OFFICE.

JOHN W. FORD, OF ALTON, ILLINOIS, ASSIGNOR OF ONE-HALF TO FRANK R. DAVIS, OF ALTON, ILLINOIS.

SCALE.

No. 824,854.  Specification of Letters Patent.  Patented July 3, 1906.

Application filed May 27, 1905. Serial No. 262,632.

*To all whom it may concern:*

Be it known that I, JOHN W. FORD, a citizen of the United States, residing at Alton, in the county of Madison and State of Illinois, have invented a new and useful Improvement in Automatic Computing - Scales, of which the following is a specification.

This invention relates to a springless automatic computing-scale; and the object of the invention is a scale of this class which will not require the use of springs, which will be simple in construction, having few movable parts, and be durable and accurate.

The invention consists in the novel features of construction and combination of parts hereinafter described, pointed out in the claims, and shown in the accompanying drawings, in which—

Figure 1:
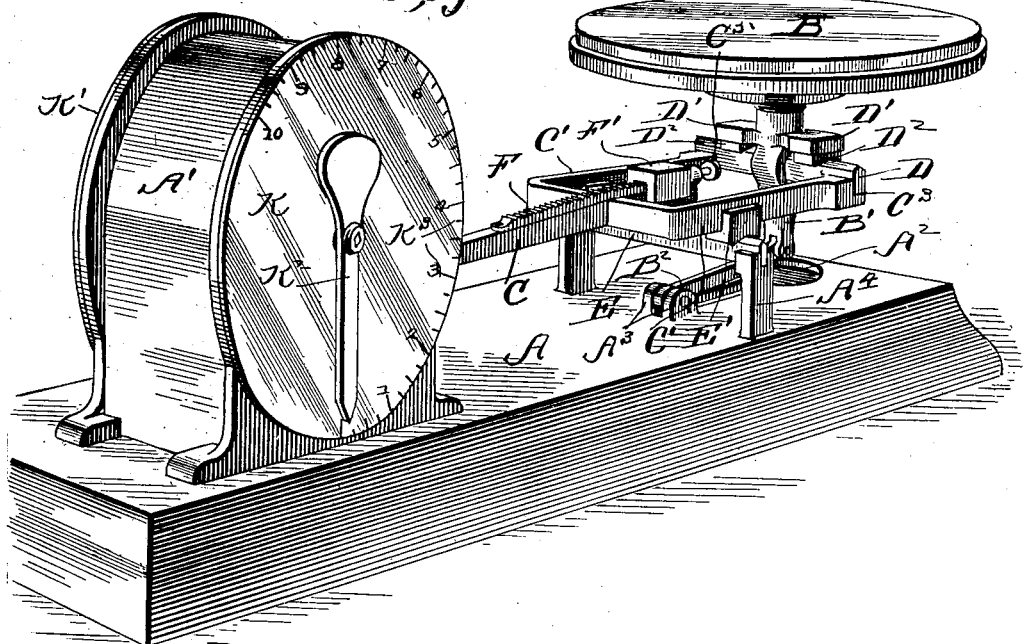
Figure 2:
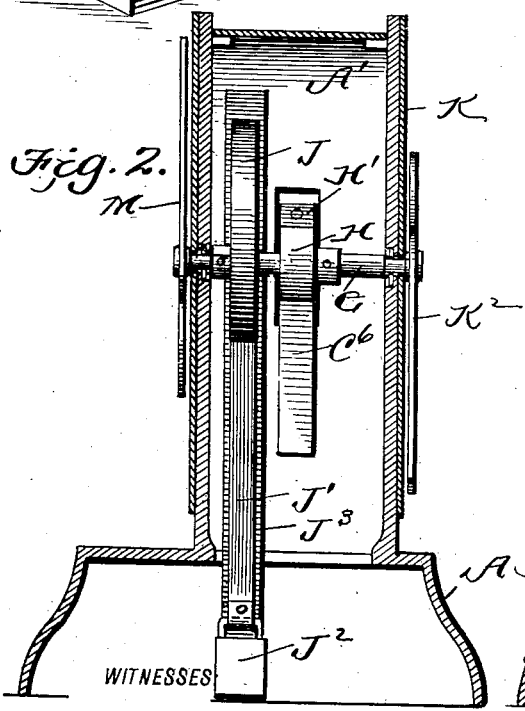
Figure 3:
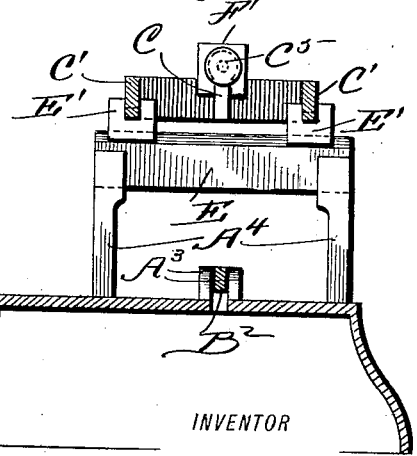
Figure 74:
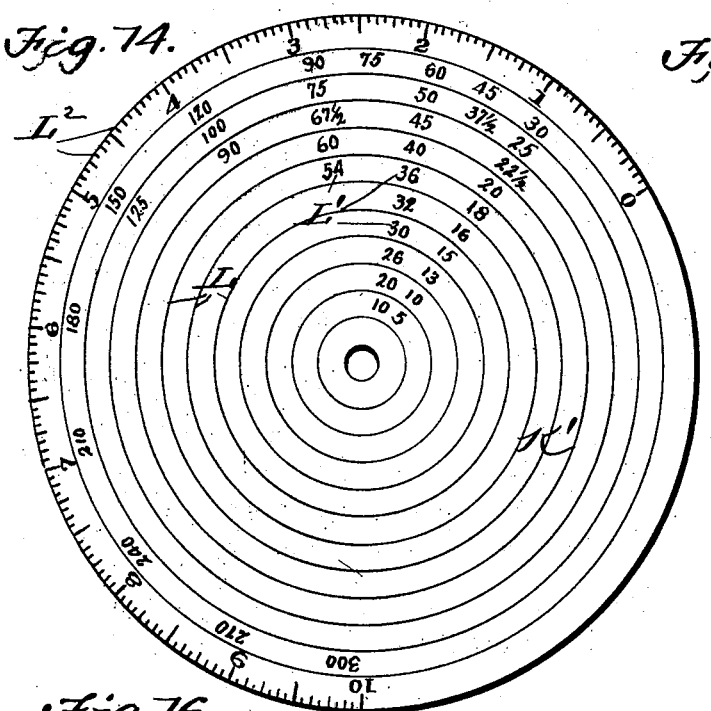
Figure 75:
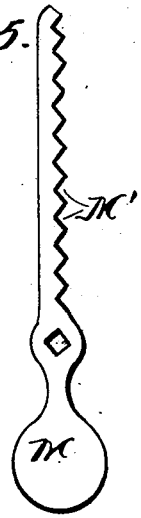
Figures 76, 77:
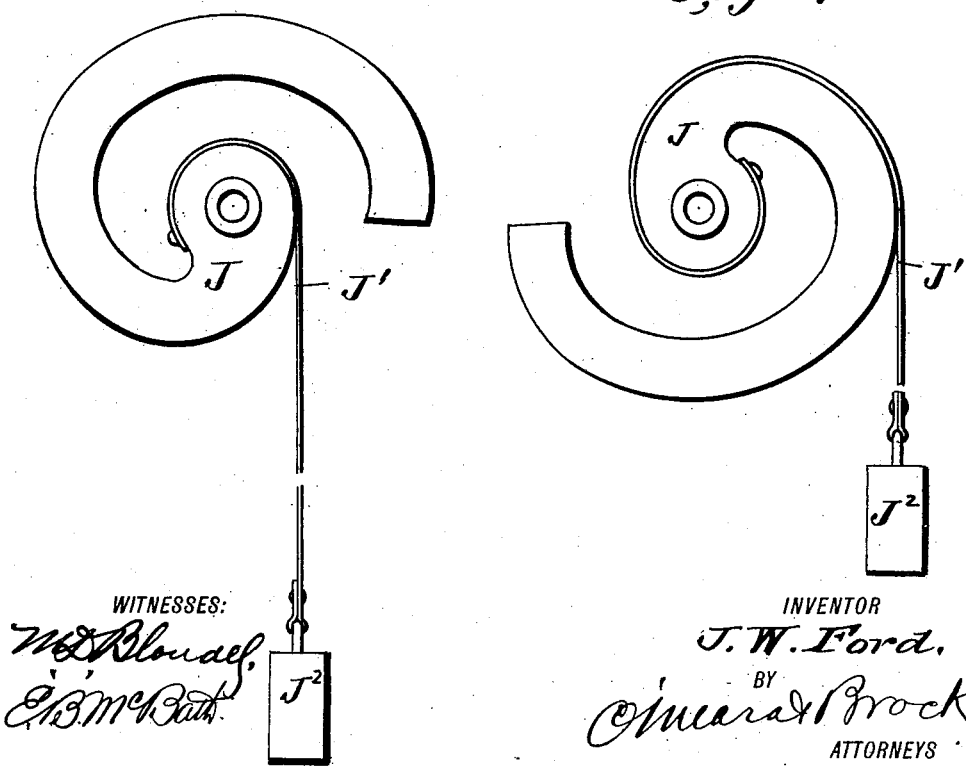

Figure 1 is a perspective view of my scale. Fig. 2 is a vertical section through the dial-casing. Fig. 3 is a transverse section through arms carried by the scale-beam, the section being taken in advance of the beam proper. Fig. 4 is a longitudinal section through my scale. Fig. 5 is a plan view, the dial-casing being in section. Fig. 6 is an end view, the base being in section and the platform and coacting parts being in elevation. Fig. 7 is a perspective detail view of a platform-standard. Fig. 8 is a perspective detail view of a scale-beam. Fig. 9 is a perspective view of a toothed rack carried by the scale-beam. Fig. 10 is a perspective view of a counterpoise-weight. Fig. 11 is a detail perspective view of a V-block. Fig. 12 is a detail perspective view of a knife-edge fulcrum - block. Fig. 13 is a perspective view of a spiral cam. Fig. 14 is a face view of a dial-plate. Fig. 15 is a side view of an indicator-hand. Fig. 16 is an outline elevation showing the spiral cam and weight in normal position. Fig. 17 is a similar view showing position of the parts when a weight is on the platform.

In the drawings, A represents a hollow base having a casing A' adjacent one end and cut out, as shown at $A^2$, adjacent the other end. At the iner end of the cut-out portion are upwardly-extending parallel lugs $A^3$ and on each side of the lugs posts $A^4$. A scale-platform B is placed at this end of the base and is vertically movable. It is supported on the upper end of a standard B', which at its lower end is pivoted to a link $B^2$, which at its inner end is pivoted between the lugs $A^3$. The standard is slotted, as shown at $B^3$. A scale-beam C has adjacent its forward ends parallel arms C', which extend in advance of the outer end of the scale-beam, and these arms are notched, as shown at $C^2$, and are reduced in thickness at their ends, as shown at $C^3$. A knife-edge bar D rests on the reduced end portions of the arms C', said bar extending through the slot $B^3$ of the standard B. A knife-edged fulcrum-bar E is supported by the posts $A^4$, and upon the fulcrum-bar are placed V-blocks E, grooved on their upper faces, as shown at $E^7$. The bar E is higher in the center than toward the ends, thus preventing sliding movement of the blocks on the bar. The arms C' of the scale-beam C rest in the grooves of the V-blocks, the notches $C^2$ fitting over the blocks and preventing sliding movement of the arms with respect to the blocks. A steel-toothed plate F is secured to the upper edge of the scale-beam and a counterpoise-weight F' is adapted to be moved along the rack F. The outer end of the scale-beam is formed with a threaded eye $C^4$, through which works a screw $C^5$, by which the normal resting-place of the weight F' on the rack F may be adjusted.

The casing A' is cut out, as shown at $A^5$, and the free end of the scale-beam extends into the casing. Transversely arranged in the casing A' is a rotatable shaft journaled in jewel - bearings and having fixed thereon within the casing a disk H. A strap H' is secured at one end to the periphery of the disk and at its opposite end to a shoe $C^6$, which is slightly curved and integral with the inner end of the scale-beam C. A spiral cam J is fixed on the shaft G, and a flexible connection formed of a cord, strip of steel, or other suitable material is secured at one end to the periphery or face of the cam J, and the other end of this strip J' is secured to a suitable weight $J^2$, which normally rests within the base A. Dial-plates K and K' are secured on opposite sides of the casing A. On the dial K travels an index or pointer $K^2$, mounted on a squared end of the shaft G, and on the dial K is a scale $K^3$, indicating pounds and fractions of a pound.

On the dial K' are laid off concentric circles L, between which are numerals L', indicating prices per pound or fractions thereof, while a scale L², indicating pounds and fractions of a pound, is placed adjacent the edge of the dial K'. An indicator-hand M, notched, as shown at M', is fixed on the shaft G and travels over the dial K', the notches alining with the numerals arranged between the circles L. To prevent the weight J² from swinging, I place a shield J³ in the casing A', which also extends downward into the base.

The operation of this scale will be obvious to those skilled in making or using such devices. When any article is placed on the platform B, the inner end of the scale C will rise, and as this end is connected by a flexible strap to the disk H the disk will be rotated to a degree proportional to the movement of the scale-beam, and this rotation will be imparted to the cam J. The rotation of the cam about the shaft will lift the weight J², and owing to the form of the cam it will be obvious that the greater the rotation of the cam the farther from the center about which it rotates will be the point of suspension of the weight and the greater the leverage given the same.

The parts may be of any suitable material and in various sizes, and any suitable matter can be printed on the two dials, or the device can be made with but one dial, if desired, without changing the manner of operating the scale.

Having thus fully described my invention, what I claim as new, and desire to secure by Letters Patent, is—

1. In a device of the kind described the combination with a shaft, having index ends and a movable scale-beam, a rotatable disk fixed upon the shaft, a cam fixed upon the shaft, a shoe carried by the scale-beam, a flexible connection between the shoe and the disk, the said shoe being adapted to press the connecting means upon the periphery of the disk and hold the same in place, a cord connected to the cam adapted to wind upon the periphery of said cam, a weight carried by the cord, and a shield adapted to guide the weight when lifted by rotation of the cam.

2. In a computing-scale, a pivoted scale-beam, a platform supported thereby, a casing inclosing the free end of the scale-beam, a rotatable shaft carried by the casing, dials carried by the casing, index-hands carried by the shaft, a disk fixed on the shaft within the casing, a shoe carried by the inner end of the scale-beam, a flexible strap connected to the shoe at the one end and to the disk at the opposite end and adapted to rotate the disk upon the movement of the scale-beam, a spiral cam carried by the shaft, a weight and flexible means connecting the weight and cam and adapted to wind upon the cam as and for the purpose set forth.

JOHN W. FORD.

Witnesses:
E. G. MERIWETHER,
FRANK R. DAVIS.